US006600007B2

(12) United States Patent
Chen et al.

(10) Patent No.: US 6,600,007 B2
(45) Date of Patent: Jul. 29, 2003

(54) PREPARATION OF BROMINE-CONTAINING HYDROXY-FUNCTIONAL COPOLYMERS

(75) Inventors: Herry (Z-X) Chen, Gilbert, AZ (US); Edward J. Lyszczek, Claremont, CA (US)

(73) Assignee: Southwest Distributing Co., Mesa, AZ (US)

( * ) Notice: Subject to any disclaimer, the term of this patent is extended or adjusted under 35 U.S.C. 154(b) by 0 days.

(21) Appl. No.: 09/819,310

(22) Filed: Mar. 27, 2001

(65) Prior Publication Data

US 2002/0143139 A1 Oct. 3, 2002

(51) Int. Cl.$^7$ .......................... C08G 63/58; C08G 63/91
(52) U.S. Cl. ....................... 528/354; 528/355; 528/358; 525/415; 525/413; 525/416
(58) Field of Search ................................ 528/354, 355; 528/358; 525/415, 413, 416

(56) References Cited

U.S. PATENT DOCUMENTS

| | | |
|---|---|---|
| 3,474,148 A | 10/1969 | Carpenter |
| 3,773,696 A * | 11/1973 | Papa et al. .............. 260/2.5 AJ |
| 3,856,865 A * | 12/1974 | Papa et al. .............. 260/615 R |
| 3,869,502 A * | 3/1975 | Papa et al. .............. 260/468 J |
| 3,907,722 A * | 9/1975 | Papa et al. .............. 260/2.5 A |
| 3,933,690 A | 1/1976 | D'Alelio et al. |
| 3,948,860 A | 4/1976 | Ogawa et al. |
| 3,950,301 A * | 4/1976 | Balog et al. .............. 260/40 R |
| 3,981,827 A * | 9/1976 | Papa et al. .............. 260/2.5 AN |
| 4,024,206 A | 5/1977 | Fintelmann et al. |
| 4,082,816 A | 4/1978 | Fisk et al. |
| 4,264,745 A | 4/1981 | Foucht |
| 4,287,313 A | 9/1981 | Uber et al. |
| 4,394,306 A | 7/1983 | Ravey |
| 4,415,728 A | 11/1983 | Tremblay |
| 4,447,591 A | 5/1984 | Watanabe et al. |
| 4,603,171 A | 7/1986 | Hsieh et al. |
| 4,621,104 A | 11/1986 | Dietrich et al. |
| 4,786,691 A | 11/1988 | Dervan et al. |
| 4,835,213 A | 5/1989 | Murai et al. |
| 4,900,785 A * | 2/1990 | Leitz et al. .................... 525/67 |
| 4,908,416 A * | 3/1990 | Leitz et al. .................. 525/411 |
| 5,705,709 A | 1/1998 | Guettes et al. |

FOREIGN PATENT DOCUMENTS

| | | |
|---|---|---|
| DD | 2166942 | 6/1976 |
| DD | 207916 | 3/1984 |
| EP | 0274908 A2 | 7/1988 |
| EP | 221586 | 4/1990 |
| GB | 1262102 | 2/1972 |
| GB | 1412384 | 5/1975 |
| GB | 2101605 | 1/1983 |

OTHER PUBLICATIONS

Database WPI, Week 8820, Derwent Publications Ltd., London GB; An 1988–137992, XP002206413, & JP 63 081124 A (Daicel Chem) abstract, & Patent Abstracts of Japan vol. 0123, No. 12, Aug. 24, 1988 (Aug. 24, 1988) & JP 63 081124 A abstract.

Stassen S et al: "Macromolecular Engineering of Polyactones and Polyactides XVI. On the Way to the Synthesis of Omega–Aliphatic Primary Amine Poly (Epsilon–Caprolactone) and Polylactides", Journal of Polymer Science, Polymer Chemistry Edition, John Wiley and Sons. New York, US, vol. 32, No. 13, Part A, Oct. 1, 1994 (Oct. 1, 1994), pp. 2443–2455, XP000469929, ISSN: 0887–624X.

Degee Ph et al: "Macromolecular Engineering of Polylactones and Polylactides. 9. Synthesis, Characterization, and Application of Omega–Primary Amine Poly (E–Caprolactone)" Macromolecules, American Chemical Society. Easton, US, vol. 25, No. 17, Aug. 17, 1992 (Aug. 17, 1992), pp. 4242–4248, XP000293301, ISSN: 0024–9297.

Dubois Ph et al: "Macromolecular Engineering of Polyactones and Polylactides 1. End–Functionalization of Poly–Caprolactone" Polymer Bulletin, Springer Verlag., Heidelberg, DE, vol. 22, No. 5/6, Dec. 1, 1989 (Dec. 1, 1989), pp. 475–482, XP000125587, ISSN: 0170–0839.

Storey R F et al: "Hydroxy–Terminated Poly (Epsilon–Caprolactone–Co≈–Valerolactone) Oligomers: Synthesis, Characterization, and Polyurethane Network Formation", Journal of Polymer Science, Polymer Chemistry Edition, John Wiley and Sons. New York, US, vol. 29, No. 12, Nov. 1, 1991 (Nov. 1, 1991), pp. 1759–1763, XPooo261979, ISSN: 0887–624X.

Dr Jurgen Falbe: "Rompp chemie Lexikon vol. 2", 1997, Georg Thieme Verlag, Stuttgart, XP002206410, Copolymere, p. 807.

Dr Jurgen Falbe: "Rompp Chemie Lexikon vol. 3", 1990, Georg Thieme Verlag, Stuttgart, XP002206411, Lactone, p. 2430.

Dr Jurgen Falbe: "Rompp chemie lexikon vol. 2", 1990, Georg Thieme Verlag, Stuttgart, XP002206412, Glykole, p. 1616–p. 1617.

English translation of JP 63–81124 (Apr. 12, 1988).

* cited by examiner

Primary Examiner—Duc Truong
(74) Attorney, Agent, or Firm—Sullivan Law Group

(57) ABSTRACT

A bromine-containing, hydroxy-functional copolymer is prepared from an initiator that is solid at room temperature and has at least one bromone atom. The initiator is reacted with an effective amount of lactone monomers, optionally in the presence of a catalyst, to establish a bromine-containing, hydroxy-functional copolymer that is a liquid at room temperature. The copolymer of this invention may be used as liquid reactive flame retardant and, in the event the copolymer is polyfunctional, as a crosslinker.

36 Claims, No Drawings

PREPARATION OF BROMINE-CONTAINING HYDROXY-FUNCTIONAL COPOLYMERS

BACKGROUND OF THE INVENTION

1. Field of the Invention

The invention relates to processes for the preparation of bromine-containing hydroxy-functional copolymers, and more specifically, to novel bromine-containing hydroxy-functional esters and polyesters. The invention further relates to the use of the bromine-containing hydroxy-functional copolymers, for example, for use as a reactive flame retardant and/or cross-linker, in urethane and non-urethane systems, including such materials as foams, coatings, adhesives, elastomers, paints, composites, and the like.

2. Description of the Related Art

Bromine-containing compounds are commonly used for the fire retardation in various polymeric materials. Fire retardants can be applied in two forms: as non-reactive additives or as co-polymerizable reactive reactants.

Generally, fire retardant additives that are non-reactive do not react with a crosslinkable polymeric matrix. Instead, the non-reactive additives are dissolved or dispersed in the crosslinked polymer matrix without chemical reaction with the polymer matrix. Because the fire retardant is not chemically bonded to the crosslinked polymer matrix, the fire retardant may migrate out from the crosslinked polymer network. Migration of the fire retardant out of the polymer diminishes or eliminates the influence that the fire retardant has on the crosslinked polymer matrix. In addition, the presence of the dissolved or dispersed fire retardant may detract from the physical properties of the polymer matrix.

A reactive fire retardant is one that reacts chemically with the other reactants, so that the fire retardant becomes permanently incorporated into the crosslinked polymer network and contributes to the overall properties of the final product.

Commonly used and commercially available reactive hydroxyl, bromine-containing fire retardants include the diester/ether diol of tetrabromophthalic anhydride, tetrabromobisphenol A-bis(2-hydroxyethyl ether), tetrabromobisphenol A (TBBPA), dibromoneopentyl glycol (DBNPG), tetrabromodipentaerythritol, 2,4-dibromophenol, 2,4,6-tribromophenol, dibromopropanol, tribromoneopentyl alcohol (TBNPA). (Encyclopedia of Chemical Technology, Vol. 10, pp. 930.)

TBBPA is the largest volume reactive flame retardant and its primary use is in epoxy resins. DBNPG has found particular application in unsaturated polyester resins and polyurethane foams, elastomers and coatings. The chemical structure of DBNPG confers to it a relatively high thermal stability and greatly contributes to its outstanding properties as a fire retardant.

One of the main disadvantages of DBNPG for polyurethanes is its limited solubility and slow dissolution rate in many of the raw materials commonly used for the preparation of polyurethane products. DBNPG is a crystalline solid (melting point (mp): 109.5° C.) and when solubilized, can react with the isocyanate component of the polyurethane formulations. For DBNPG to be used effectively in polyurethane formulations, DBNPG must be introduced and dissolved in the polyol component. However, most of the commercially available polyols, including polyester polyols and polyether polyols, show relatively low solubility for DBNPG. If DBNPG is not fully dissolved in the polyol components, several problems may result, such as poor physical and retardation properties as well as blockage of the lines and nozzles of polyurethane manufacturing equipment.

For highly fire resistant rated materials, it is often desirable to add twenty percent or more of the fire retardant DBNPG to the final product. The limited solubility of DBNPG in various polyether and polyester polyols gives DBNPG a significant disadvantage when used in many polyurethanes (e.g., foams, coatings, adhesives, elastomers) and non-polyurethane thermosets (e.g., coatings, paints, composites).

A number of proposals have been offered for overcoming this drawback of DBNPG. The Dow Chemical Company developed a liquid flame retardant based on DBNPG. This material, known under the trademark XNS-50044, is prepared by esterifying DBNPG (two moles) with adipic acid (one mole). The final liquid fire retardant is a hydroxyl terminated polyester polyol (D. P. Miller, Journal of Cellular Plastics, July/August 1979, pp. 211–219). However the disadvantage of this final product is cost. A further disadvantage of the adipate is its tendency to form a very viscous mass due to polyester formation.

A similar process is reportedly described in DD-A 2,166,942, where bromine-containing alcohol components are reacted with carboxylic acids to produce polyesters. However, the high viscosity of these products prevents them from being used in all polyurethane systems.

Another possibility is the process described in DD-A 207,916 and U.S. Pat. No 4,394,306, in which bromine-containing polyols including DBNPG and dibromobutenediol react with formalin solution (35–38% of formaldehyde) to form polyoxymethylene hemi-formals through hydroxymethylation reaction. Hydroxymethylation between an alcohol and formaldehyde results in the substitution of the hydrogen atom of the alcoholic hydroxyl groups by —$CH_2$—OH groups leading to a terminal hydroxyl group.

Further reaction with additional formaldehyde can occur to form high molecular weight polyoxymethylene hemi-formals. As described, this process can provide hydroxyl-terminal groups, which can be used as reactive groups for further use in polyurethanes (e.g., foams, coatings, adhesives, elastomers) and non-polyurethane thermosets (e.g., coatings, paints, composites). However, the reaction between alcohol and formaldehyde is difficult to control and usually causes an undesirable increase in the viscosity of the final reactive bromine-containing alcohol. In addition, segregation and incompatibilities can result when the resulting products are used in polyurethane systems.

U.S. Pat. No. 3,933,690 discloses the bromination of 2-butyne-1,4-diol to produce 2,3-dibromo-2-butene-1,4-diol, then the dibromobutenediol is blended with a variety of polyols including polyether and polyester polyols, and even propylene oxide for an alkoxylation reaction. However, this process leads to a darkly colored dibromobutenediol, and evolution of bromine. In addition, the final product is a mixture of bromine-containing and non-bromine-containing polyols.

GB-A 1,412,384 and EP-B 0,221,586 discloses the preparation of bromine-containing polyols by the reaction of butenediol or butynediol with epichlorohydrin and/or other alkylene oxides and bromination of the unsaturated polyols produced. However, this process produces polyols having a low content of bromine and low functionality. These polyols find use only in hard polyurethane foams at the expense of quality.

U.S. Pat. No. 3,474,148 discloses the preparation of bromine-containing monoalkyl ethers of trimethylolpropane or pentaerythritol by brominating the corresponding allyl ethers. However, the preparation of allyl ethers is a slow reaction and is difficult to control. In addition, the subsequent bromination produces a number of side reactions producing a large number of reaction products.

U.S. Pat. No. 3,948,860 discloses a process to liquefy dibromoneopentyl glycol, in which dibromoneopentyl glycol reacts with phosphoric anhydride to produce dibromoneopentyl glycol phosphoric acid ester, which is subjected to alkoxylation with epichlorohydrin and/or propylene oxide. The final product is phosphorus-halogen-containing flame retardant. However, the dark color of the final product limited its practical use in certain applications, for instance, where a clear or transparent coating is required.

U.S. Pat. No. 4,621,104 proposes a process for preparation of bromine-containing polyether polyols in which unsaturated diols such as butyne-1,4-diol polymerize with alkylene oxides such as ethylene oxide and propylene oxide to produce unsaturated polyether polyols. The unsaturated polyether polyols are then brominated. Disadvantageously, the final product is dark in color and the bromination yield is very low (no content of bromine available).

The use of dimethyl methyl phosphonate to stabilize brominated polyesters such as a copolymer of dibromoneopentyl glycol, maleic anhydride and phthalic anhydride is disclosed in U.S. Pat. No. 4,024,206. The copolymer of dibromoneopentyl glycol, maleic anhydride and phthalic anhydride is commonly used in polyester systems. However, it is expected that the very high viscosity of the copolymer precludes the use of the copolymer in a polyurethane system.

U.S. Pat. No. 4,264,745 discloses a method for preparing a bromine-containing polyester in which low viscosity tetraethylene glycol or diethylene glycol is mixed with dibromoneopentyl glycol (solid). Tetrabromophthalic anhydride is then added to produce a very high viscosity polyester, followed by alkoxylating the bromine-containing polyester with ethylene oxide or propylene oxide. However, this process results in a mixture of bromine-containing and non-bromine-containing polyesters. In addition, very high viscosity and bromine evolution are expected.

U.S. Pat. No. 5,705,709 discloses the preparation of bromine-containing polyether polyols where dibromoneopentyl glycol is mixed with water or a polyether polyol (such as a glycerine initiated propylene oxide polyol), then propylene oxide is added. An alkoxylation reaction is undertaken to form a bromine-containing polyether polyol.

The use of high melting point initiators (such as sucrose, sorbitol and pentaerythritol), as described in many of the above patents, often results in the production of darkly colored conventional polyether polyols (non-bromine-containing polyols) due to discoloration or decomposition of the initiators. To avoid the discoloration and decomposition problems described above, water, low viscosity diols, organic solvents or polyols are added prior to the alkoxylation step to dissolve or disperse the high melting point initiators. Since dibromoneopentyl glycol decomposes more readily than the above described initiators, the use of diluents prior to alkoxylation is more of a necessity when dibromoneopentyl glycol is the initiator.

If polyols are used as the starting diluent to dissolve dibromoneopentyl glycol, not only will the dibromoneopentyl glycol be alkoxylated, but the polyol diluent will also undergo alkoxylation. This will result in an end product with a reduced bromine content and higher viscosity as well as a mixture of bromine-containing polyether polyol and non-bromine-containing polyether polyol due to the addition of the polyol diluent. The examples in U.S. Pat. No. 5,705,709 indicate that the final products have bromine content of only 13–16% and are homogeneous.

In summary, for liquefying bromine-containing glycols such as dibromoneopentyl glycol, many proposals have been suggested and practiced. The proposals summarized above are confined mostly to alkoxylation and esterification synthesis methods. Thus far, none on these proposals can be used effectively to provide a reactive bromine-containing flame retardant for polyurethane foams, polyurethane coatings, polyurethane adhesives, polyurethane elastomers, and thermosetting coatings and composites based on the combined criteria of high bromine content, wide applicability, low viscosity, clear color, and high compatibility with polyether polyols, polyester polyols and even epoxy resins. A very promising approach among these proposals is alkoxylating a bromine-containing diol with propylene oxide and adding additional polyols in an attempt to avoid discoloration. But discoloration is not avoided, and together with the low bromine content of alkoxylated bromine-containing diols presents obstacles to wide commercial use in various polyurethane systems.

To provide such features as low viscosity, high bromine content, clear color and better compatibility as well as imparting better physical properties to final products, new approaches and ideas need to be proposed and practiced.

OBJECTS OF THE INVENTION

Accordingly, an object of the present invention is to provide a process for preparing a liquid, bromine-containing hydroxy-functional copolymer that possesses sufficiently low viscosity so that the problems described above can be reduced or overcome, while having a relatively high bromine content so that good flame retardant properties may be realized.

It is also an object of the present invention according to another aspect to provide a process for reacting a bromine-containing hydroxy-functional copolymer with compatible polymers, which may include polyurethanes, such as foams, coatings, adhesives, and elastomers, and thermosetting coatings, composites, and the like.

It is another object of the present invention to provide a process for improving the flame retardant properties of polyurethanes (e.g., foam, coating, adhesive, elastomer) and thermosetting coatings, composites, and the like.

It is still another object of the present invention to provide a process for crosslinking a polyurethane or thermoset with the bromine-containing, hydroxy-functional copolymer of this invention.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

Before the present compounds, compositions, and methods are disclosed and described, it should be understood and appreciated that the invention is not limited to specific ingredients and reaction mechanisms discussed herein, as such may vary. It is also to be understood that the terminology used herein is for the purpose of describing particular embodiments and enabling those of ordinary skill in the art to make and use the invention.

It is also to be noted that, as used in the specification and the appended claims, the singular forms "a", "an", and "the" include plural referents unless the context clearly dictates otherwise.

The term "polymer" is used in its normal sense in the field of chemistry, and may be construed broadly to mean a molecule or substance formed by the chemical union of two or more combining units called monomers, and is meant to include oligomers. The term copolymer is meant to encompass a polymer in which two or more of the monomers differ. Terpolymer means a polymer made from three or more different monomers. The term copolymer is meant to encompass terpolymers.

The term "block copolymer" is used in its normal sense in the field of chemistry, and is meant to be construed broadly to mean a non-random polymer comprising distinct segments or blocks, with each of the segments or blocks respectively made up of a single unit or more than one identical repeating units. Block copolymers include, but are not limited to, AB diblock copolymers and ABA triblock copolymers, as well as star polymers containing three or more segments or blocks of a monomer unit or repeating monomer units emanating from a core structural unit. Thus, an AB diblock copolymer can range from a lower limit of 2 total monomer units to a macromolecule.

The term "polyol" is meant to include compounds having two or more hydroxyl functionalities, including diols.

In accordance with an aspect of the present invention as embodied and broadly described herein, certain of the above objects are attained by a process for preparing a bromine-containing, hydroxy-functional copolymer. The process comprises (a) providing an initiator having at least one bromine atom, wherein the initiator is a solid at room temperature, and (b) reacting the initiator with an effective amount of lactone monomers to establish a bromine-containing, hydroxy-functional copolymer that is a liquid at room temperature. The copolymers preferably comprise block copolymers.

Preferably but optionally, the lactone monomers comprise at least one member selected from the group consisting of β-propiolactone, β-butyrolactone, α,α-bis(chloromethyl) propiolactone, δ-valerolactone, α,β,γ-trimethoxy-δ-valerolactone, 1,4-dioxane-2-one, glycolide, lactide, 1,4-dithiane-2,5-dione, trimethylene carbonate, neopentylene carbonate, ethylene oxalate, propylene oxalate, ε-caprolactone, β-methyl-ε-isopropyl-ε-caprolactone, γ-methyl-ε-caprolactone, ε-methyl-ε-caprolactone, and β,δ-dimethyl-ε-caprolactone.

Again, optionally, the initiator comprises a monohydric alcohol, wherein the bromine-containing, hydroxy-functional copolymer comprises an AB diblock copolymer consisting of an A block and a B block, wherein the process comprises forming the B block from the monohydric alcohol and forming the A block from one or more of the lactone monomers, and wherein the A block comprises either an ester or a polyester. The initiator may comprise at least one monohydric alcohol selected from the group consisting of 2,4-dibromophenol, 2,4,6-tribromophenol, dibromopropanol, and tribromoneopentyl alcohol.

In a presently preferred version of the process, the reacting (b) comprises propagating a ring-opening polymerization reaction to provide the bromine-containing, hydroxy-functional block copolymer with a polyester block, wherein the polyester block has at least two ester repeating units and a hydroxy functionality.

The initiator also may comprise a glycol, and the bromine-containing copolymer may comprise an ABA triblock copolymer consisting of two hydroxy-functional A blocks and a B block, wherein the process comprises forming the B block from the glycol and forming each of the A blocks from at least a respective one of the lactone monomers, each of the A blocks independently comprising an ester or a polyester.

The initiator also may comprise at least one member selected from the group consisting of tetrabromobisphenol A, tetrabromobisphenol A-bis(2-hydroxy-ethyl ether), dibromoneopentyl glycol, and tetrabromodipentaerythritol. The reacting (b) may comprise propagating a ring-opening polymerization reaction to provide the bromine-containing, hydroxy-functional block copolymer with at least one polyester block, wherein the polyester block has at least two ester repeating units and a hydroxy functionality.

The process also optionally may comprise adding a catalyst that forms a complex with the initiator prior to said reacting (b) so that the initiator is present as the complex during said reacting (b). It also may comprise adding a catalyst comprising at least one member selected from the group consisting of boron trifluoride, sodium methoxide, calcium methoxide, aluminum isopropoxide, tetrabutyl titanate, titanium chelates, titanium acylates, lead oxides, zinc borates, antimony oxide, sulfuric acid, hydrochloric acid, phosphoric acid, p-toluenesulfonic acid, tin(II) oxide, tin (II) octoate, and tin(II) acetate.

In some implementations of the method, the bromine-containing, hydroxy-functional block copolymer has an average molecular weight in a range of 300 to 2000. Also in some implementations, the bromine-containing, hydroxy-functional block copolymer has a Gardner color of less than 1.0. In addition, the bromine-containing, hydroxy-functional block copolymer preferably has a viscosity in a range of 50 cps to 4500 cps at 25° C., and the bromine-containing, hydroxyl-functional block copolymer preferably has a bromine weight content of 10% to 39%.

In accordance with another aspect of the invention, a process is provided which comprises (a) providing an initiator having at least one bromine atom, wherein the initiator is a solid at room temperature, (b) reacting at least one member selected from the group consisting of the initiator and a complex of the initiator and an optional catalyst with an effective amount of lactone monomers to establish a bromine-containing, hydroxy-functional copolymer that is a liquid at room temperature, and (c) reacting the bromine-containing, hydroxy-functional copolymer with a polymer. The copylymer preferably comprises a block copolymer.

The initiator optionally may comprise a monohydric alcohol, and the reacting (c) may comprise grafting the bromine-containing, hydroxy-functional copolymer to the polymer. The initiator also may comprise a polyol, and the reacting (c) may comprise crosslinking the polymer with the bromine-containing, hydroxy-functional copolymer.

DETAILED DESCRIPTION OF PREFERRED EMBODIMENTS AND METHODS OF THE INVENTION

Reference will now be made in detail to the presently preferred embodiments and methods of the invention as described below. It should be noted, however, that the invention in its broader aspects is not limited to the specific details, representative devices and methods, and examples described in this section in connection with the preferred embodiments and methods. The invention according to its various aspects is particularly pointed out and distinctly claimed in the attached claims read in view of this specification, and appropriate equivalents.

In accordance with one aspect of the invention, a process is provided for preparing a bromine-containing, hydroxy-functional copolymer. The process comprises providing an initiator having at least one bromine atom, wherein the initiator is a solid at room temperature. The copolymer preferably comprises a block copolymer.

The initiator according to this aspect of the invention may comprise a bromine-containing monomer, or an oligomer, e.g., prepared from one or more bromine-containing monomers. The bromine-containing monomers preferably comprise at least one hydroxyl group. Representative monohydric initiators include, for example, 2,4-dibromophenol, 2,4,6-tribromophenol, dibromopropanol, and tribromoneopentyl alcohol. Representative polyhydric initiators include a diester/ether diol of tetrabromophthalic anhydride, tetrabromobisphenol A (TBBPA), tetrabromobisphenol A-bis(2-hydroxy-ethyl ether), dibromoneopentyl glycol (DBNPG), and tetrabromodipentaerythritol.

The initiator may comprise a monohydric alcohol, in which case preferably the bromine-containing, hydroxy-functional copolymer would comprise an AB diblock copolymer consisting of an A block and a B block, wherein the process comprises forming the B block from the monohydric alcohol and forming the A block from one or more of the lactone monomers, and wherein the A block comprises either an ester or a polyester. The initiator may comprise at least one monohydric alcohol selected from the group consisting of 2,4-dibromophenol, 2,4,6-tribromophenol, dibromopropanol, and tribromoneopentyl alcohol. Optionally but preferably, the reacting (b) would comprise propagating a ring-opening polymerization reaction to provide the bromine-containing, hydroxy-functional block copolymer with a polyester block, wherein the polyester block has at least two ester repeating units and a hydroxy functionality.

The initiator also may comprise a glycol, and the bromine-containing block copolymer may comprise an ABA triblock copolymer consisting of two hydroxy-functional A blocks and a B block. In this case, the process preferably would comprise forming the B block from the glycol and forming each of the A blocks from at least a respective one of the lactone monomers, wherein each of the A blocks independently comprises an ester or a polyester. The initiator may comprise at least one member selected from the group consisting of tetrabromobisphenol A, tetrabromobisphenol A-bis(2-hydroxy-ethyl ether), dibromoneopentyl glycol, and tetrabromodipentaerythritol. In this event, the reacting (b) preferably may comprise propagating a ring-opening polymerization reaction to provide the bromine-containing, hydroxy-functional block copolymer with at least one polyester block, wherein the polyester block has at least two ester repeating units and a hydroxy functionality.

Further in accordance with this aspect of the invention, the process includes reacting the initiator with an effective amount of lactone monomers to establish a bromine-containing, hydroxy-functional copolymer that is a liquid at room temperature. Various lactones capable of undergoing ring-opening reactions may be used within the scope of this invention. A representative, but non-exhaustive list of lactones that may be suitable for this invention include the following: 4-member ring lactones, such as β-propiolactone, β-butyrolactone, and α,α-bis(chloromethyl)propiolactone; 6-member ring lactones, such as δ-valerolactone, α,β,γ-trimethoxy-δ-valerolactone, 1,4-dioxane-2-one, and 1,4-dithiane-2,5-dione; and 7-member ring lactones, such as ε-caprolactone, and β-methyl-ε-isopropyl-ε-caprolactone. Currently, β-propiolactone, β-butyrolactone, γ-valerolactone, and ε-caprolactone are preferred. Other lactones comprise glycolide, lactide, trimethylene carbonate, neopentylene carbonate, ethylene oxalate, propylene oxalate, γ-methyl-ε-caprolactone, ε-methyl-ε-caprolactone, and β,δ-dimethyl-ε-caprolactone.

While not wishing to be limited by any theory, it is believed that the ring-opening reaction occurs as follows in the case of a diol initiator, by way of example. Mono-ols and higher functional polyols are believed to react in much the same manner. Each of the hydroxyl groups, which optionally may be complexed with a catalyst, reacts with a respective lactone monomer. The rings of the lactone monomers are opened between the —O— and the adjacent carbonyl (keto) group, with the carbonyl group bonding to the diol. The —O— oxy group of each opened lactone monomer resides at the terminal position, and is available to attack the carbonyl of another lactone monomer (thereby extending the segment) or react with hydrogen to terminate the segment. The ability of the reaction to propagate is dependent upon the molar ratio of lactone monomers to initiator.

Catalysts may optionally be used during the reaction. The process optionally but preferably, for example, may include adding a catalyst that may form a complex with the initiator prior to said reacting (b) so that the initiator is present as the complex during said reacting (b). A wide array of catalysts may be appropriate for preferred implementations of this invention.

Catalysts that are suitable for use with the present invention include, by way of example, boron trifluoride, sodium methoxide, calcium methoxide, aluminum isopropoxide, tetraalkyl titanates such as tetrabutyl titanate, titanium chelates, titanium acylates, lead salts, lead oxides, zinc borates, antimony oxide, inorganic acids such as sulfuric acid, hydrochloric acid, phossphoric acid, p-toluenesulfonic acid, tin(II) oxide, tin(II) octoate, and tin(II) acetate. For low temperature polymerization and eliminating the evolution of bromine from solid bromine-containing compound, tin(II) oxide and p-toluenesulfonic acid are preferred as catalysts.

If the bromine-containing alcohol initiator used in the present invention contains one hydroxyl group—for example, tribromoneopentyl alcohol (TBNPA), 2,4-dibromophenol, 2,4,6-tribromophenol, dibromopropanol—the resulting copolymer generally will be an AB type of block copolymer having a functionality of about 1.0. In this case, the A-block is derived from one or more of the lactone monomers, and the B-block is derive from the bromine-containing alcohol. On the other hand, if the bromine-containing initiator used in the present invention contains two hydroxyl groups—for example, the diester/ether diol of tetrabromophthalic anhydride, tetrabromobisphenol A (TBBPA), tetrabromobisphenol A-bis(2-hydroxy-ethyl ether), and dibromoneopentyl glycol (DBNPG)—the resulting polyesters are an ABA type of block copolymer having a functionality of about 2.0. In this case, each of the A-blocks is derived from one or more of the lactone monomers, and the B-block is derived from the bromine-containing glycol.

In accordance with a preferred embodiment of this aspect of the invention, the bromine-containing initiator selected is solid at room temperature, but is liquefied upon reaction with an effective proportion of the lactone monomers. Depending upon the initiator selected, the ability to liquefy the bromine-containing initiator may depend upon controlling the length of the A-segment or A-segments of AB or ABA block copolymers, respectively.

If the length of the A-segment of AB or ABA block copolymers is too short, the goal of liquefying the bromine-containing initiator may not be reached, and the resulting copolymer will be inhomogeneous, i.e., not completely liquefied. In these cases, the homogeneous block copolymers can be obtained when the A-segment is lengthened through polymerization. Control over the length of the A-segments may be realized by adjusting the mole ratio of the bromine-containing initiator to the lactones monomers, so as to obtain homogeneous liquid copolymers.

Another aspect of the invention comprises providing a bromine-containing copolymer that is convenient and easy to use in polyurethane applications, such as polyurethane foams, coatings, adhesives, and elastomers. This aspect of the invention optionally can be furthered by the provision of a homogeneous liquid that is low in viscosity and free of precipitates. For example, the addition of small amounts of caprolactone monomer, in less than a 1.75:1.0 molar ratio (caprolactone monomer to DPNPG) results in a high viscosity product with a precipitate present. However, by increasing amount of caprolactone monomer to a molar ratio of about 2.0:1.0 (caprolactone monomer to DPNPG), the viscosity generally can be lowered to an acceptable range and the precipitate can be dissipated. Further increases to the monomer-to-initiator molar ratio lower the viscosity, but also reduce the proportion of bromine content in the end product. If the ring-opening polymerization reaction propagates for too long to produce high molar ratios of caprolactone monomer to initiator, the end product may become a solid at room temperature with a significantly lower bromine proportional content. Therefore, factors such as viscosity and bromine content may be balanced in selecting the ratio of lactone monomer to initiator block.

Many of the objects of this invention, including the formation of a homogeneous, clear color liquid, may be obtained in accordance with an embodiment of this invention by practicing a molar ratio of $\epsilon$-caprolactone to dibromoneopentyl glycol in the range of 1.5:1.0 (39.5:60.5 by weight) to 3.0:1.0 (56.6:43.4 by weight). More preferably, the molar ratio of $\epsilon$-caprolactone to dibromoneopentyl glycol is in the range of 1.75:1.0 (43:57 by weight) to 2.5:1.0 (52:48 by weight). These ratios may vary for different combinations of lactone monomers and initiators. Determining acceptable molar ratios is within the purview of those of ordinary skill in the art when taken in reference to the teachings of this specification.

By way of example, in one embodiment of the invention using $\epsilon$-caprolactone as the lactone monomer and dibromoneopentyl glycol as the initiator, the average number molecular weight of the block copolymer may be in the range of 350 to 2000. Higher molecular weight block copolymers may be prepared to lower viscosity, although the proportional bromine content will decline as the lactone-derived blocks increase in molecular weight.

In accordance with another aspect of this invention, a process is provided that comprises (a) providing an initiator having at least one bromine atom, the initiator being a solid at room temperature, (b) reacting at least one member selected from the group consisting of the initiator and a complex of the initiator and an optional catalyst with an effective amount of lactone monomers to establish a bromine-containing, hydroxy-functional block copolymer that is a liquid at room temperature, and (c) reacting the bromine-containing, hydroxy-functional block copolymer with a polymer. In presently preferred versions of this process, a liquid, reactive bromine-containing hydroxy-functional copolymer is reacted with polymers, especially polyurethanes, such as polyurethane foams, coatings, adhesives, elastomers, and the like. Preferably, the reaction has the effect of increasing flame retardation and/or crosslinking the polymer. The initiator, lactone monomers and optional catalyst and related processing may be as described above.

As indicated above, solid bromine-containing monools and polyols are more sensitive to temperature than the lactone monomers, and may evolve bromine at high temperatures. In addition, bromine-containing monools and polyols are-prone to evolution of bromine leading to discoloration. These problems can be largely overcome by practice of preferred versions of the present invention, because the lactone monomers react with and stabilize the monools and polyols.

A surprising difference between the ring-opening polymerization of lactones and oxiranes, such as propylene oxide and ethylene oxide, is the exothermic phenomena. The ring-opening polymerization of oxiranes is a very vigorous exothermal reaction, so that the incremental addition of oxiranes during the entire polymerization process must be practiced for temperature control. If propylene oxide or ethylene oxide were used for the purpose of liquefying DBNPG, the evolution of bromine from solid bromine-containing polyols would be unavoidable, and the DBNPG would not be homogeneously liquefied in the small amount of oxirane permitted for temperature control. On the other hand, for the ring-opening polymerization of lactones such as $\epsilon$-caprolactone, the lactone monomers such as $\epsilon$-caprolactone can be added all at once to a solid bromine-containing glycol such as DBNPG at the initial stage of the polymerization, because a vigorous exothermal reaction does not result. The addition of a large amount of liquid $\epsilon$-caprolactone not only improves the viscosity of slurry reaction system, but also can dissolve all of the solid bromine-containing glycol to form a low viscosity homogeneous liquid system. This can be important when it is desired to obtain a clear color (no or substantially no evolution of bromine from solid bromine-containing glycol) in the final product.

The temperature sensitivity of the bromine-containing alcohols may be further reduced in the context of the inventive process by controlling reaction temperature to avoid the evolution of bromine from bromine-containing alcohols. A suitable temperature range for avoiding bromine evolution and its deleterious discoloration effect is 120° C. to 160° C. For example, a reaction temperature range for reacting $\epsilon$-caprolactone and an initiator to produce a homogeneous and clear color additive at a high conversion rate is 130° C. to 150° C.

In another preferred use, the bromine-containing hydroxy-functional copolymer made according to this aspect of the invention may be used as a liquid flame retardant in a polyurethane composition, such as a polyurethane foams, coatings, adhesives, and elastomers. The liquid, reactive bromine-containing flame retardant made according to this aspect of the invention not only can improve the flame resistant properties, but also can improve the compatibility and physical properties of the final polyurethane products. For better compatibility, $\epsilon$-caprolactone is the presently preferred candidate, because of the nature of the chemical structure of $\epsilon$-caprolactone and its homopolymer, polycaprolactone. Poly($\epsilon$-caprolactone) also can enhance physical properties, including, for example, stress, strain characteristics, low-temperature resistance, shrinking resistance, and hydrolytic stability.

Both the monofunctional and difunctional flame retardants made according to this aspect of the invention have applications in the flexible polyurethane foams, coatings, adhesives and elastomers, and play the role as intraplasticizers without migrating out from crosslinked polymer networks.

In the case of a monofunctional, reactive, bromine-containing flame retardants prepared according to this aspect of the invention, the flame retardant can be grafted to the polymer chain of a polyurethane or other appropriate polymer. For example, the hydroxy functionality of the flame retardant typically is reactive with many isocyanate, epoxide, and carboxyl moieties. Due to their monofunctionality, the pendant polymer chains derived from the flame retardants typically will not make a significant contribution to physical properties of the polyurethane that are primarily dependent upon crosslinking density.

On the other hand, difunctional bromine-containing flame retardants prepared according to preferred aspects of the present invention also can function as a crosslinking agent or crosslinker to increase crosslinking density in the crosslinked polymer network polymer. As a result, difunctional bromine-containing flame retardants may contribute to the physical properties of crosslinked polymer network. In terms of improving physical properties, dibromoneopentyl glycol is the currently preferred initiator for making the difunctional broming-containing flame retardants.

When the inventive process may be practiced in accordance with the teachings and conditions set forth above, the resulting liquid, reactive, clear color bromine-containing copolymers can possess the following physical properties: homogeneity in a liquid state (no separation at low temperature even at –20° C.; clear color (Gardner color<1.0); hydroxyl number: 180–250 mg KOH/g; viscosity 50 cps to 100,000 cps, preferably 50 cps to 4500 cps @ 25° C.; bromine weight content: 10–39%; and functionality of about 2.0.

The following examples serve to explain embodiments and methods of the present invention in more detail. These examples are merely illustrative and are not to be construed as being exhaustive or exclusive as to the scope of this invention.

In the following examples, dibromoneopentyl glycol (DBNPG) is taken as the initiator starting material for the ring-opening copolymerization of the following examples. For the purpose of the examples, ε-caprolactone is taken as a lactone monomer for liquefying the solid bromine-containing glycol (DBNPG), with the end goal of better compatibility, better physical properties, low viscosity, and clear color. The selection of dibromoneopentyl glycol (DBNPG) and ε-caprolactone, and the practice of the conditions set forth below resulted in the formation of a liquid, low viscosity, water clear, brominated di-functional polyols with a high bromine content. These brominated glycols were expected to have good compatibility with polyurethanes, and the resulting copolymers are easily reacted with common isocyanates to form high molecular weight polyurethane polymers.

EXAMPLES

Example 1

157.1 g (0.599 mole) of dibromoneopentyl glycol, 742.9 g (6.517 mole) of ε-caprolactone and 40 ppm of tin(II) oxide were charged into 1000 ml three-neck flask. The contents were heated to 115° C., a vacuum was established, and a nitrogen purge was applied three times. The reaction temperature was maintained at 140° C. over 6.0 hrs. The resulting product was a homogeneous clear-like liquid (water-like appearance) liquid at room temperature. After holding at a temperature under –20° C. for one week, the copolymer was found to retain its crystallization. Although not wishing to be bound by any theory, the reason for crystallization of the copolymer might be the high molecular weight of the caprolactone-dibromoneopentyl glycol copolymer. Generally, homopolymers of ε-caprolactone are crystalline solids when molecular weight of 800 to 1000 is reached. The theoretical molecular weight of the resulting copolymer of caprolactone and dibromoneopentyl glycol was about 1500 based on the mole ratio of 10.86:1.0 of caprolactone to dibromoneopentyl glycol. The analytical data of the resulting reactive bromine-containing copolymer were as follows:

Hydroxyl number: 54 mg KOH/g
Molecular weight (theoretically): 1500
Color: clear water-like (Gardner<1.0)
Bromine content: 10.1%

Example 2

235.8 g (0.90 mole) of dibromoneopentyl glycol, 664.2 g (5.83 mole) of ε-caprolactone and 40 ppm of tin(II) oxide were charged into 1000 ml three-neck flask. The contents were heated to 115° C., a vacuum was established, and a nitrogen purge was applied three times. The reaction temperature was maintained at 140° C. over 6.0 hrs. The resulting product was a homogeneous liquid with clear, water-like appearance at room temperature. After holding at a temperature under –20° C. for one week, no crystallization of the copolymer was found. While not wishing to be limited to any theory, one of the reasons for the copolymer not crystallizing might be the lower molecular weight of caprolactone-dibromoneopentyl glycol copolymer. The theoretical molecular weight of resulting caprolactone-dibromoneopentyl glycol was about 1000 based on the mole ratio of 6.47:1.0 of caprolactone to dibromoneopentyl glycol. Another reason might be that the length of the DBNPG segment in the copolymer was long compared to the length of the lactone segment to interfere with the crystallization of the caprolactone segment, even though a molecular weight of 1000 was reached. The analytical data of the resulting reactive bromine-containing copolymer were as follows:

Hydroxyl number: 93 mg KOH/g
Molecular weight (theoretically): 1000
Color: clear water-like (Gardner<1.0)
Bromine content: 15.5%

Example 3

668.3 g (2.55 mole) of dibromoneopentyl glycol, 581.7 g (5.10 mole) of ε-caprolactone and 40 ppm of tin(II) oxide were charged into 1000 ml three-neck flask. The contents were heated to 115° C., a vacuum was established, and a nitrogen purge was applied three times. The reaction temperature was maintained at 140° C. over 6.0 hrs. The resulting product was a homogeneous liquid with very clear color at room temperature. After holding at a temperature under –20° C. for one week, no unreacted dibromoneopentyl glycol precipitate was observed. The clear color and no precipitation of unreacted DBNPG were believed to be attributable of higher molar ratio of lactone monomer to solid dibromoneopentyl glycol (2.0/1.0). The length of caprolactone segment was long enough to convert the dibromoneopentyl glycol segment into a liquid phase. On the other hand, the segment of caprolactone was short enough to interfere with crystallization of the resulting copolymer. The theoretical molecular weight of the resulting copolymer was about 500 based on the molar ratio of 2.0:1.0 of lactone monomer to solid dibromoneopentyl glycol. The analytical data of the resulting reactive bromine-containing copolymer were as follows:
Hydroxyl number: 220 mg KOH/g
Viscosity: 390 cps @ 25° C.
Color: clear water-like (Gardner<1.0)
Bromine content: 32.5%

Example 4

283.83 g (1.084 mole) of dibromoneopentyl glycol, 216.17 g (1.89 mole) of $\epsilon$-caprolactone and 40 ppm of Tin(II) oxide were charged into a 500 ml three-neck flask. The contents of the flask were heated to 115° C., a vacuum was established, and the flask was purged with nitrogen three times. The reaction temperature was maintained at 140° C. over 6.0 hrs. The resulting product was homogeneous liquid with very light yellow color. After holding at a temperature under −20° C. for one week, no unreacted dibromoneopentyl glycol precipitate was observed. The very light yellow color and no precipitation of unreacted DBNPG were believed to be attributable of higher molar ratio of lactone monomer to solid dibromoneopentyl glycol (1.75/1.0) in which the length of caprolactone segment is long enough to convert DBNPG segment into liquid phase. The analytical data of the resulting reactive bromine-containing copolymer were as follows:
Hydroxyl number: 230 mg KOH/g
Viscosity: 3100 cps @ 25° C.
Color: very light yellow (Gardner: 1.0–2.0)
Bromine content: 35.0%

Example 5

323.83 g (1.236 mole) of dibromoneopentyl glycol, 176.17 g (1.55 mole) of $\epsilon$-caprolactone and 40 ppm of tin(II) oxide were charged into a 500 ml three-neck flask. The contents of the flask were heated to 115° C., a vacuum was established, and the flask was purged with nitrogen three times. The reaction temperature was maintained at 140° C. over 6.0 hrs. The resulting product was homogeneous liquid with very yellow color at room temperature. After holding at a temperature under −20° C. for one week, a very small amount of unreacted dibromoneopentyl glycol precipitate was observed. The precipitate at low temperature was believed to be attributable of a lower molar ratio of 1.25:1.0 of lactone monomer to dibromoneopentyl glycol initiator. Homogeneous liquid of the resulting product at room temperature is believed to be an indication that a small amount of un-reacted dibromoneopentyl glycol can be dissolved in the resulting liquid copolymer, but its low solubility at low temperature leads to precipitation. The analytical data of the resulting reactive bromine-containing copolymer were as follows:
Hydroxyl number: 257 mg KOH/g
Viscosity: 3800 cps @ 25° C.
Color: yellow (Gardner: 2.0–3.0)
Bromine content: 39.0%

Example 6

313.55 g (1.19 mole) of dibromoneopentyl glycol, 136.45 g (1.19 mole) of $\epsilon$-caprolactone and 40 ppm of Tin(II) oxide were charged into a 500 ml three-neck flask. The contents of the flask were heated to 115° C., a vacuum was established, and the flask was purged with nitrogen three times. The reaction temperature was maintained at 140° C. over 6.0 hrs.

The resulting product was in-homogeneous very viscous liquid with brown color at room temperature. After holding at a temperature under −20° C. for one week, more precipitate was observed. The precipitate was believed to be attributable of 1.0:1.0 molar ratio of lactone monomer to dibromoneopentyl glycol initiator. It is believed of that the precipitate may contain unreacted dibromoneopentyl glycol and copolymer of lactone and dibromoneopentyl glycol with low molecular weight. For the low molecular weight copolymer, the length of lactone segment is not long enough to convert the initiator into entirely into the liquid phase.

Example 7

668.3 g (2.55 mole) of dibromoneopentyl glycol, 581.7 g (5.10 mole) of $\epsilon$-caprolactone and 200 ppm of p-toluenesulfonic acid were charged into a 1000 ml three-neck flask. The contents were heated to 115° C., a vacuum was established, and a nitrogen purge was applied three times. The reaction temperature was maintained at 140° C. over 6.0 hrs. The resulting product was a homogeneous liquid with very clear color at room temperature. After holding at a temperature under −20° C. for one week, no unreacted dibromoneopentyl glycol precipitate and no crystallization were observed. The results indicated that p-toluenesulfonic acid is a suitable catalyst for the ring-opening polymerization of $\epsilon$-caprolactone. The analytical data of the resulting reactive bromine-containing copolymer were as follows:
Hydroxyl number: 216 mg KOH/g
Viscosity: 350 cps @ 25° C.
Color: clear water-like (Gardner<1.0)
Bromine weight content: 32.0%

Example 8

668.3 g (2.55 mole) of dibromoneopentyl glycol, 581.7 g (5.10 mole) of $\epsilon$-caprolactone and 200 ppm of p-toluenesulfonic acid were charged into a 1000 ml three-neck flask. The contents were heated to 115° C., a vacuum was established, and a nitrogen purge was applied three times. The reaction temperature was maintained at 160° C. over 6.0 hrs. The resulting product was a homogeneous liquid with yellow color at room temperature. After holding at a temperature under −20° C. for one week, no unreacted dibromoneopentyl glycol precipitate was observed. The yellow color of resulting product was believed to be attributable of higher reaction temperature of 160° C. which lead to certain degree of decomposition of dibromoneopentyl glycol. The analytical data of the resulting reactive bromine-containing copolymer were as follows:
Hydroxyl number: 217 mg KOH/g
Viscosity: 400 cps @ 25° C.
Color: yellow (Gardner: 2.0–3.0)
Bromine weight content: 32.0%

Example 9

243.57 g (0.929 mole) of dibromoneopentyl glycol, 256.43 g (2.249 mole) of $\epsilon$-caprolactone and 40 ppm of Tin(II) oxide were charged into a 500 ml three-neck flask. The contents were heated to 115° C., a vacuum was established, and a nitrogen purge was applied three times. The reaction temperature was maintained at 160° C. over 6.0 hrs. The resulting product was a homogeneous liquid with yellow color at room temperature. After holding at a temperature under −20° C. for one week, no unreacted dibromoneopentyl glycol precipitate was observed. The yellow color of resulting product was believed to be attributable of higher reaction temperature of 160° C. which lead to certain level of decomposition of dibromoneopentyl glycol even at a high ratio of 2.5:1.0 of lactone monomer to dibromoneopentyl glycol.

The analytical data of the resulting reactive bromine-containing copolymer were as follows:
Hydroxyl number: 195 mg KOH/g
Viscosity: 400 cps @ 25° C.
Color: yellow (Gardner: 2.0–3.0)
Bromine weight content: 28.50%

Example 10

668.3 g (2.55 mole) of dibromoneopentyl glycol, 581.7 g (5.10 mole) of ε-caprolactone and 40 ppm of Tin(II) oxide were charged into a 1000 ml three-neck flask. The contents were heated to 115° C., a vacuum was established, and a nitrogen purge was applied three times. The reaction temperature was maintained at 140° C. over 6.0 hrs. The resulting product was a homogeneous liquid with very clear color at room temperature. 300 grams of the resulting copolymer was taken into 500 ml distilling flask and applied 190° C. and 10 mm Hg of vacuum over 3.0 hours to remove unreacted ε-caprolactone. The result indicated that no unreacted ε-caprolactone was found.

The foregoing description of the invention has been provided for the purpose of explaining the principles of the invention and its practical application, thereby enabling others skilled in the art to understand the invention for various embodiments and with various modifications as are suited for the particular use contemplated. The foregoing detailed description is not intended to be exhaustive or to limit the invention to the precise embodiments disclosed. Modifications and equivalents will be apparent to practitioners skilled in the art and are encompassed within the spirit and scope of the appended claims.

What is claimed is:

1. A process for preparing a bromine-containing, hydroxy-functional copolymer, said process comprising:
   (a) providing an initiator having at least one bromine atom, the initiator being a solid at room temperature; and
   (b) reacting the initiator with an effective amount of lactone monomers to establish a bromine-containing, hydroxy-functional copolymer that is a liquid at room temperature.

2. A process according to claim 1, wherein the lactone monomers comprise at least one member selected from the group consisting of β-propiolactone, β-butyrolactone, α,α-bis(chloromethyl) propiolactone, δ-valerolactone, α,β,γ-trimethoxy-δ-valerolactone, 1,4-dioxane-2-one, glycolide, lactide, 1,4-dithiane-2,5-dione, trimethylene carbonate, neopentylene carbonate, ethylene oxalate, propylene oxalate, ε-caprolactone, β-methyl-ε-isopropyl-ε-caprolactone, γ-methyl-ε-caprolactone, ε-methyl-ε-caprolactone, and β,δ-dimethyl-ε-caprolactone.

3. A process according to claim 1, wherein the initiator comprises a monohydric alcohol, wherein the bromine-containing, hydroxy-functional copolymer comprises an AB diblock copolymer consisting of an A block and a B block, wherein the process comprises forming the B block from the monohydric alcohol and forming the A block from one or more of the lactone monomers, and wherein the A block comprises either an ester or a polyester.

4. A process according to claim 3, wherein the initiator comprises at least one monohydric alcohol selected from the group consisting of 2,4-dibromophenol, 2,4,6-tribromophenol, dibromopropanol, and tribromoneopentyl alcohol.

5. A process according to claim 3, wherein said reacting (b) comprises propagating a ring-opening polymerization reaction to provide the bromine-containing, hydroxy-functional copolymer with a polyester block, wherein the polyester block has at least two ester repeating units and a hydroxy functionality.

6. A process according to claim 1, wherein the initiator comprises a glycol, and wherein the bromine-containing copolymer comprises an ABA triblock copolymer consisting of two hydroxy-functional A blocks and a B block, wherein the process comprises forming the B block from the glycol and forming each of the A blocks from at least a respective one of the lactone monomers, each of the A blocks independently comprising an ester or a polyester.

7. A process according to claim 6, wherein the initiator comprises at least one member selected from the group consisting of tetrabromobisphenol A, tetrabromobisphenol A-bis(2-hydroxy-ethyl ether), dibromoneopentyl glycol, and tetrabromodipentaerythritol.

8. A process according to claim 6, wherein said reacting (b) comprises propagating a ring-opening polymerization reaction to provide the bromine-containing, hydroxy-functional copolymer with at least one polyester block, wherein the polyester block has at least two ester repeating units and a hydroxy functionality.

9. A process according to claim 1, further comprising adding a catalyst that forms a complex with the initiator prior to said reacting (b) so that the initiator is present as the complex during said reacting (b).

10. A process according to claim 1, further comprising adding a catalyst comprising at least one member selected from the group consisting of boron trifluoride, sodium methoxide, calcium methoxide, aluminum isopropoxide, tetrabutyl titanate, titanium chelates, titanium acylates, lead oxides, zinc borates, antimony oxide, sulfuric acid, hydrochloric acid, phosphoric acid, p-toluenesulfonic acid, tin(II) oxide, tin(II) octoate, and tin(II) acetate.

11. A process according to claim 1, wherein the bromine-containing, hydroxy-functional copolymer has an average molecular weight in a range of 300 to 2000.

12. A process according to claim 1, wherein the bromine-containing, hydroxy-functional copolymer has a Gardner color of less than 1.0.

13. A process according to claim 1, wherein the bromine-containing, hydroxy-functional copolymer has a viscosity in a range of 50 cps to 4500 cps at 25° C.

14. A process according to claim 1, wherein the bromine-containing, hydroxyl-functional copolymer has a bromine weight content of 10% to 39%.

15. A process comprising:
   (a) providing an initiator having at least one bromine atom, the initiator being a solid at room temperature;
   (b) reacting the initiator with an effective amount of lactone monomers to establish a bromine-containing, hydroxy-functional copolymer that is a liquid at room temperature; and
   (c) reacting the bromine-containing, hydroxy-functional copolymer with a polymer.

16. A process according to claim 15, wherein the lactone monomers comprise at least one member selected from the group consisting of α,α-bis(chloromethyl) propiolactone, δ-valerolactone, α,β,γ-trimethoxy-δ-valerolactone, 1,4-dioxane-2-one, glycolide, lactide, 1,4-dithiane-2,5-dione, trimethylene carbonate, neopentylene carbonate, ethylene oxalate, propylene oxalate, γ-valerolactone, ε-caprolactone. β-methyl-ε-isopropyl-ε-caprolactone, γ-methyl-ε-caprolactone, ε-methyl-ε-caprolactone, and β,δ-dimethyl-ε-caprolactone.

17. A process according to claim 15, wherein the initiator comprises a monohydric alcohol, and wherein the bromine-containing, hydroxy-functional copolymer comprises an AB diblock copolymer consisting of an A block and a B block, wherein the process comprises forming the B block from the monohydric alcohol and forming the A block from one or more of the lactone monomers, wherein the A block is an ester or a polyester.

18. A process according to claim 17, wherein the initiator comprises at least one monohydric alcohol selected from the group consisting of 2,4-dibromophenol, 2,4,6-tribromophenol, dibromopropanol, and tribromoneopentyl alcohol.

19. A process according to claim 17, wherein said reacting (b) comprises propagating a ring-opening polymerization reaction to provide the bromine-containing, hydroxy-functional copolymer with a polyester block, wherein the polyester block has at least two ester repeating units and a hydroxy functionality.

20. A process according to claim 15, wherein the initiator comprises a glycol, and wherein the bromine-containing copolymer comprises an ABA triblock copolymer consisting of two hydroxy-functional A blocks and a B block, wherein the process comprises forming the B block from the glycol and forming each of the A blocks from at least a respective one of the lactone monomers, and wherein the A blocks are each independently selected from the group consisting of an ester and a polyester.

21. A process according to claim 20, wherein the initiator comprises at least one member selected from the group consisting of tetrabromobisphenol A, tetrabromobisphenol A-bis(2-hydroxy-ethyl ether), dibromoneopentyl glycol, and tetrabromodipentaerythritol.

22. A process according to claim 20, wherein said reacting (b) comprises propagating a ring-opening polymerization reaction to provide the bromine-containing, hydroxy-functional copolymer with at least one polyester block, wherein the polyester block has at least two ester repeating units and a hydroxy functionality.

23. A process according to claim 15, wherein said process comprises adding a catalyst to form a complex with the initiator prior to said reacting (b) so that the initiator is present as the complex during said reacting (b).

24. A process according to claim 23, wherein the catalyst comprises at least one member selected from the group consisting of boron trifluoride, sodium methoxide, calcium methoxide, aluminum isopropoxide, tetrabutyl titanate, titanium chelates titanium acylates, lead oxides, zinc borates, antimony oxide, sulfuric acid, hydrochloric acid, phosphoric acid, p-toluenesulfonic acid, tin(II) oxide, tin(II) octoate, and tin(II) acetate.

25. A process according to claim 15, wherein the bromine-containing, hydroxy-functional copolymer has an average molecular weight in a range of 300 to 2000.

26. A process according to claim 15, wherein the bromine-containing, hydroxy-functional copolymer has a Gardner color of less than 1.0.

27. A process according to claim 15, wherein the bromine-containing, hydroxy-functional copolymer has a viscosity in a range of 50 cps to 4500 cps at 25° C.

28. A process according to claim 15, wherein the bromine-containing, hydroxyl-functional copolymer has a bromine weight content of 10% to 39%.

29. A process according to claim 15, wherein the initiator comprises a monohydric alcohol, and wherein said reacting (c) comprises grafting the bromine-containing, hydroxy-functional copolymer to the polymer.

30. A process according to claim 15, wherein the initiator comprises a polyol, and wherein said reacting (c) comprises crosslinking the polymer with the bromine-containing, hydroxy-functional copolymer.

31. A process according to claim 1, wherein said reacting is conducted in a temperature range of 120° C. to 160° C.

32. A process according to claim 1, wherein said reacting is conducted in a temperature range of 130° C. to 150° C.

33. A process according to claim 32, wherein the bromine-containing, hydroxy-functional copolymer has a Gardner color of less than 1.0.

34. A process according to claim 15, wherein said reacting is conducted in a temperature range of 120° C. to 160° C.

35. A process according to claim 15, wherein said reacting is conducted in a temperature range of 130° C. to 150° C.

36. A process according to claim 35, wherein the bromine-containing, hydroxy-functional copolymer has a Gardner color of less than 1.0.

* * * * *

UNITED STATES PATENT AND TRADEMARK OFFICE
CERTIFICATE OF CORRECTION

PATENT NO. : 6,600,007 B2
DATED : July 29, 2003
INVENTOR(S) : Herry (Z-X) Chen and Edward J. Lyszczek It is certified that error appears in the above-identified patent and that said Letters Patent is hereby corrected as shown below:

Title page,
Item [57], ABSTRACT,
Line 3, change "bromone" to -- bromine --.

Column 16,
Line 48, change "hydroxyl-functional" to -- hydroxy-functional --.
Line 64, change the period at the end of line 64 to a comma.

Column 18,
Line 5, insert a comma after "chelates".

Signed and Sealed this

Sixth Day of July, 2004

JON W. DUDAS
*Acting Director of the United States Patent and Trademark Office*